June 16, 1925.  P. KRAMARIUK  1,542,148
PUZZLE
Filed Oct. 20, 1924
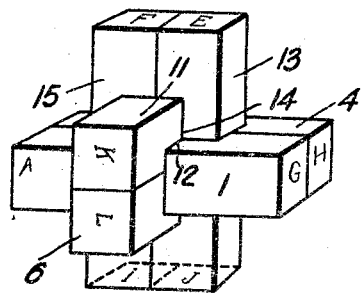
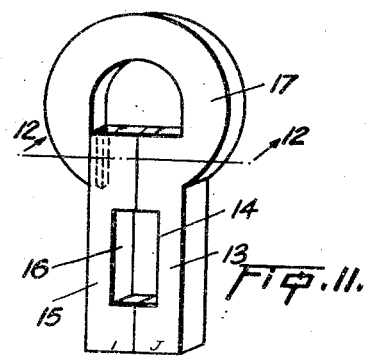
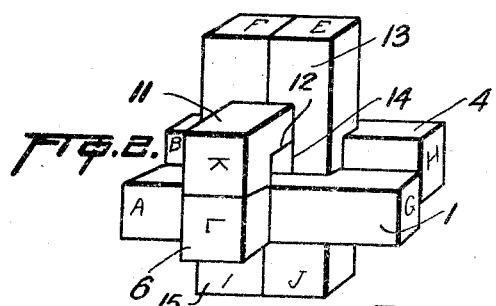
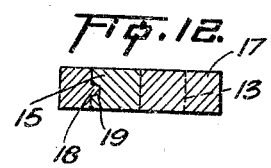
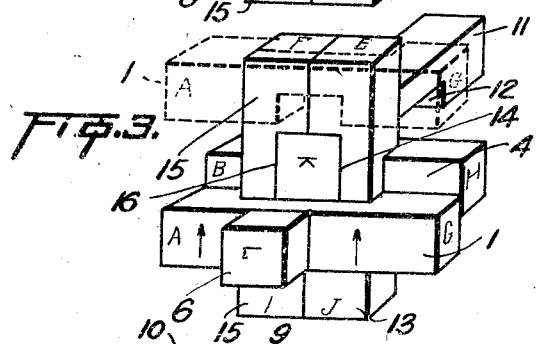
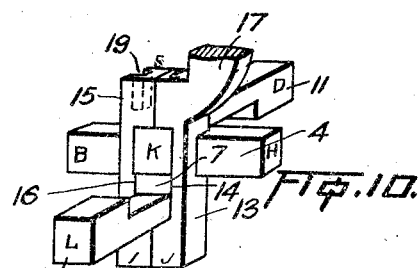
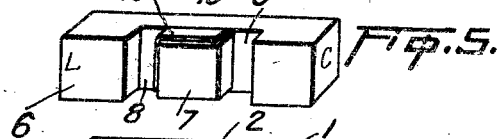
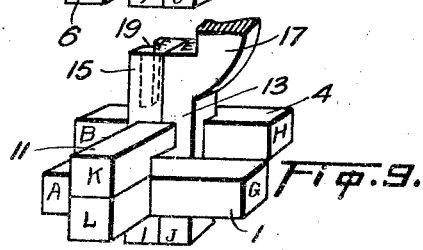
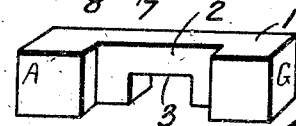
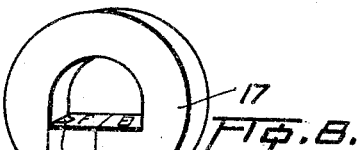
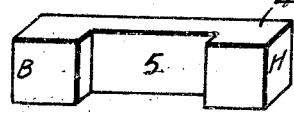
Inventor.
P. Kramariuk Patented June 16, 1925.

1,542,148

UNITED STATES PATENT OFFICE.

PETER KRAMARIUK, OF SAULT STE. MARIE, ONTARIO, CANADA.

PUZZLE.

Application filed October 20, 1924. Serial No. 744,834.

*To all whom it may concern:*

Be it known that I, PETER KRAMARIUK, a subject of the King of Great Britain, and a resident of the city of Sault Ste. Marie, in the district of Algoma, in the Province of Ontario, Canada, have invented certain new and useful Improvements in Puzzles, of which the following is the specification.

My invention relates to improvements in puzzles and the object of the invention is to devise a puzzle constructed of numerous pieces that will require considerable ingenuity and patience to take it apart and put it together.

A further object is to devise a puzzle in which the respective pieces are provided with letters or figures to indicate the combination, which, when once known, will permit the puzzle to be readily taken apart and put together.

A still further object is to construct a puzzle in which one of the pieces is provided with a yoke which will enable the puzzle to be used as a combination lock.

My invention consists of a puzzle constructed and arranged all as hereinafter described and illustrated in the accompanying drawing in which:

Fig. 1 represents a perspective view of the puzzle in its assembled form.

Fig. 2 is a similar view showing the first step in taking the puzzle apart.

Fig. 3 is a similar view showing the key piece about to be removed.

Fig. 4 is a perspective detail of the key piece.

Fig. 5 is a perspective detail of a piece provided with locking means.

Fig. 6 is a perspective detail of a typical piece representing the remaining pieces of the puzzle.

Fig. 7 is a perspective detail of the locking means applied to the piece illustrated in Figure 5.

Fig. 8 is a perspective view of a modification of a puzzle in the assembled form showing a yoke constituted on one of the pieces, the free end of the said yoke coacting with another of the pieces.

Fig. 9 is a perspective view of the modification showing it in the position illustrated in Figure 2.

Fig. 10 is a perspective view of the modification showing it in the form illustrated in Figure 3, only with the key piece removed.

Fig. 11 is a perspective view of the yoke piece showing the coacting piece applied thereto, and Fig. 12 is a horizontal section through the line 12—12 Figure 11.

Like characters of reference indicate corresponding parts in the different views.

1 is the key piece constructed of a strip of material of rectangular cross section with the central rebate 2 extending inwardly from one side thereof and a smaller rebate 3 extending inwardly from a side of the piece at right angles to the side provided with the rebate 2.

4 is a typical piece provided with a rebate 5 extending inwardly from one of the sides, said rebate being of similar dimensions to the rebate 2 and the remaining pieces, which are four in number, being preferably identical in size and shape to the piece 4.

6 is a piece having locking means and provided on one side with the block 7 positioned intermediately of the rebates 8 and 9 so that the block 7 is inset from the side of the piece provided with the rebate.

10 is a U-shaped locking member adapted to straddle the block 7 so that the base of the locking member is positioned in the rebate 8. The pieces required for the puzzle are six in number and are preferably of the same general form and dimensions.

Of the remaining pieces 11 is one piece provided with the rebate 12. 13 is another piece provided with the rebate 14 and 15 is the last piece provided with the rebate 16.

In the modification illustrated in Figures 8 to 12 the piece 13 is provided with a yoke extension 17 preferably formed integrally therewith and the free end of the yoke having a tongue 18 on its inner face adapted to be inserted into a slot 19 on the coacting face of the piece 15.

The puzzle being of the combination variety it is preferably provided with letters or figures at the ends of the pieces. As illustrated the piece 1 carries at one end the letter "A" and at the other end the letter "G". The piece 4 carries at one end the letter "B" and at the other end the letter "H". The piece 6 carries at one end the letter "C" and at the other end the letter "L". The piece 11 carries at one end the letter "D" and at the other end the letter "K". The piece 13 carries at one end the letter "E" and at the other end the letter "J" and the remaining piece 15 carries at one end the letter "F" and at the other end the letter "I".

To assemble the puzzle take the piece 6 and place it so that "L" is at the top and "C" at the bottom, turning the rebated side toward one, then set the piece 4 in the lower groove with the rebated side upwards, the reduced portion of the piece 4 being of substantially the width of the lower groove 9. Then take the piece 11 and place it alongside the piece 6, the end "D" beside the end "C" and the end "K" beside the end "L", the rebated side being toward the rebate in the piece 6. Then take the piece 13 and apply it to the pieces 6 and 11 so that the rebate extends around the sides thereof, pressing it downwardly into the rebate 5 in the piece 4. Now take the piece 15 and apply it to the pieces 6 and 11 in the same manner so that the rebate 16 straddles such pieces, pressing the piece down into the other end of the rebate 5 of the piece 4. Then pressing on the end "K" of the piece 11 push as far as possible towards the piece 4. Then apply the rebate 3 of the piece 1 to the rebate 8 in the piece 6, pressing the piece 1 down as far as possible until the face opposite the rebated face is flush with the face of the piece 6. Now push back the piece 11 until the end "K" is flush with the end "L" and finally push the piece 1 toward the piece 11 so that it enters the rebate 12 therein.

The puzzle is now complete and all that remains to be done is to turn it so that the ends "K" "L" are lowermost, tapping such ends on any hard surface. This will cause the locking member 10 to enter the rebate 2 with the result that the piece 1 is prevented from moving.

Where the device is used as a lock in place of a padlock or similar contrivance, the first step in assembling it would be to place the yoke 17 of the piece 13 into position on the piece 15 as illustrated in Figure 11.

To take the puzzle apart find the piece 1, place the index fingers of both hands on the side thereof, pressing the thumbs against the ends "E" and "F" of the pieces 13 and 15 respectively, pressing the piece 1 against the member 11 and having done so place the ends "C" and "D" of the members 6 and 11 respectively down on some hard surface, such as a table, and strike such ends gently thereagainst. Then place the thumbs against the ends "I" and "J" of the pieces 15 and 13 respectively and the index fingers on the side of the piece 1, pressing the piece 1 against the piece 6 until such piece 1 is clear of the piece 11 when the piece 11 is moved towards its end "D" to the full extent so that its end "K" will lie substantially flush to the face of the pieces 13 and 15 as is illustrated in Figure 3. By pushing the member 1 upwardly as indicated by the arrows in Figure 3, this piece can be removed and when this is done the puzzle can be readily taken apart, as the piece constitutes the key piece.

In removing the modified form the same procedure takes place, the piece 15 being in this case the last piece removed when the yoke 17 can be removed, from the eye or staple to which it may be connected.

From the above description it will be apparent that I have devised a simple and effective puzzle which can also be adapted for use as a lock in place of the ordinary padlock and in which the numbers or letters representing the combination can easily be re-arranged to preclude a person knowing the combination of one lock, opening another.

What I claim as my invention is:

1. A puzzle comprising a plurality of interlocking pieces arranged in cruciform structure, a key piece constituting one of the pieces, and a piece provided with locking means for locking the key piece against displacement.

2. A puzzle comprising a plurality of interlocking pieces arranged in cruciform structure, and each having a rebate extending inwardly from one side, a key piece having a rebate extending inwardly from one side and a rebate extending inwardly from a side at right angles to such side provided with the first mentioned rebate, and a piece with a rebate extending inwardly from one side and provided with locking means for the key piece.

3. A puzzle comprising a plurality of interlocking pieces arranged in cruciform structure, and each having a rebate extending inwardly from one side, a key piece having a rebate extending inwardly from one side and a rebate extending inwardly from a side at right angles to such side provided with the first mentioned rebate, and a piece with a rebate extending inwardly from one side, a block disposed in such rebate so as to leave smaller rebates on each side thereof, and a U-shaped locking member on said block, the base of the locking member positioned in one of the small rebates.

4. A device of the character described comprising a plurality of interlocking pieces arranged in cruciform structure, and each having a rebate extending inwardly from one side, one of the pieces arranged in opposed relation to another piece, a hook-shaped yoke formed on one end of the first mentioned piece and having its free end adapted to engage the second mentioned piece, a key piece having a rebate extending inwardly from one side and a rebate extending inwardly from a side at right angles to such side provided with the first mentioned rebate, and a piece with a rebate extending inwardly from one side and provided with locking means for the key piece.

5. A device of the character described comprising a plurality of interlocking pieces arranged in cruciform structure, and each having a rebate extending inwardly from one side, one of the pieces arranged in opposed relation to another piece, a hook-shaped yoke formed on one end of the first mentioned piece and having its free end provided with a tongue adapted to enter a slot in the coacting face of the second mentioned piece, a key piece having a rebate extending inwardly from one side and a rebate extending inwardly from a side at right angles to such side provided with the first mentioned rebate, and a piece with a rebate extending inwardly from one side and provided with locking means for the key piece.

PETER KRAMARIUK.